(12) United States Patent
Ekstrom et al.

(10) Patent No.: US 10,508,580 B2
(45) Date of Patent: Dec. 17, 2019

(54) COMBINED HEAT EXCHANGER AND EXHAUST SILENCER

(71) Applicant: Volvo Car Corporation, Gothenburg (SE)

(72) Inventors: Fredrik Ekstrom, Uddevalla (SE); Hans Erik Olsen, Lerum (SE); Mattias Svensson, Save (SE)

(73) Assignee: Volvo Car Corporation, Gothenburg (SE)

( * ) Notice: Subject to any disclaimer, the term of this patent is extended or adjusted under 35 U.S.C. 154(b) by 211 days.

(21) Appl. No.: 15/583,134

(22) Filed: May 1, 2017

(65) Prior Publication Data
US 2018/0073412 A1 Mar. 15, 2018

(30) Foreign Application Priority Data

Sep. 12, 2016 (EP) .................................. 16188360

(51) Int. Cl.
*F01N 5/02* (2006.01)
*F01N 1/24* (2006.01)
*F01N 3/02* (2006.01)

(52) U.S. Cl.
CPC .............. *F01N 5/02* (2013.01); *F01N 1/24* (2013.01); *F01N 3/0205* (2013.01); *F01N 2230/00* (2013.01); *F01N 2240/02* (2013.01); *F01N 2240/36* (2013.01); *F01N 2410/00* (2013.01); *F01N 2470/00* (2013.01); *F01N 2470/24* (2013.01); *Y02T 10/16* (2013.01); *Y02T 10/20* (2013.01)

(58) Field of Classification Search
CPC . F01N 5/02; F01N 1/24; F01N 3/0205; F01N 2230/00; F01N 2240/36; F01N 2240/02; F01N 2470/00; F01N 2470/24; Y02T 10/16; Y02T 10/20
USPC .................................................. 181/254, 237
See application file for complete search history.

(56) References Cited

U.S. PATENT DOCUMENTS 2,625,234 A * 1/1953 Fina .................... F01N 1/082
181/239
5,723,827 A * 3/1998 Sasaki ..................... F01N 1/02
181/237

(Continued)

FOREIGN PATENT DOCUMENTS

DE  102012202390 A1  8/2013
EP      2693011 A1  2/2014

(Continued)

*Primary Examiner* — Forrest M Phillips
(74) *Attorney, Agent, or Firm* — Snyder, Clark, Lesch & Chung, LLP

(57) ABSTRACT

The present invention relates to a combined heat exchanger and exhaust silencer for a vehicle, comprising a bypass valve configured to: in a first state, allow a flow path for exhaust gas to be open from an inlet to an outlet via an at least partly perforated bypass pipe, and in a second state, close said flow path, whereby at least a main portion of said exhaust gas is forced through a second flow channel comprising a heat exchanger pipe. The second flow channel is formed by an annular space between an at least partly perforated second pipe and an at least partly perforated third pipe. A sound absorbing material surrounds the bypass pipe and the third pipe, and is further arranged inside the second pipe.

15 Claims, 6 Drawing Sheets

(56) References Cited

U.S. PATENT DOCUMENTS

| | | | | |
|---|---|---|---|---|
| 6,598,390 B2* | 7/2003 | Chang | ............... | F01N 1/006 181/227 |
| 7,610,993 B2* | 11/2009 | Sullivan | ............... | F01N 1/02 181/212 |
| 7,673,720 B2* | 3/2010 | Meneely | ............... | F01N 1/02 181/212 |
| 8,469,142 B2* | 6/2013 | Feng | ............... | F01N 1/085 181/254 |
| 10,082,058 B2* | 9/2018 | Creager | ............... | F01N 1/166 |
| 2006/0054381 A1* | 3/2006 | Takemoto | ............... | F01N 1/003 181/237 |
| 2008/0023264 A1* | 1/2008 | Pacini | ............... | F01N 1/165 181/237 |
| 2009/0045006 A1* | 2/2009 | Kondo | ............... | F01N 1/04 181/252 |
| 2011/0131961 A1* | 6/2011 | Lee | ............... | F01M 5/001 60/320 |
| 2011/0289905 A1* | 12/2011 | Acre | ............... | F01N 3/043 60/320 |
| 2012/0024507 A1 | 2/2012 | Paze | | |
| 2012/0144814 A1* | 6/2012 | Won | ............... | F01M 5/001 60/320 |
| 2019/0040781 A1* | 2/2019 | Capelle | ............... | F01N 5/02 |

FOREIGN PATENT DOCUMENTS

| | | |
|---|---|---|
| EP | 2733322 A1 | 5/2014 |
| EP | 2942500 A1 | 11/2015 |
| WO | 9737109 A1 | 10/1997 |
| WO | 2008/117580 A1 | 10/2008 |

* cited by examiner

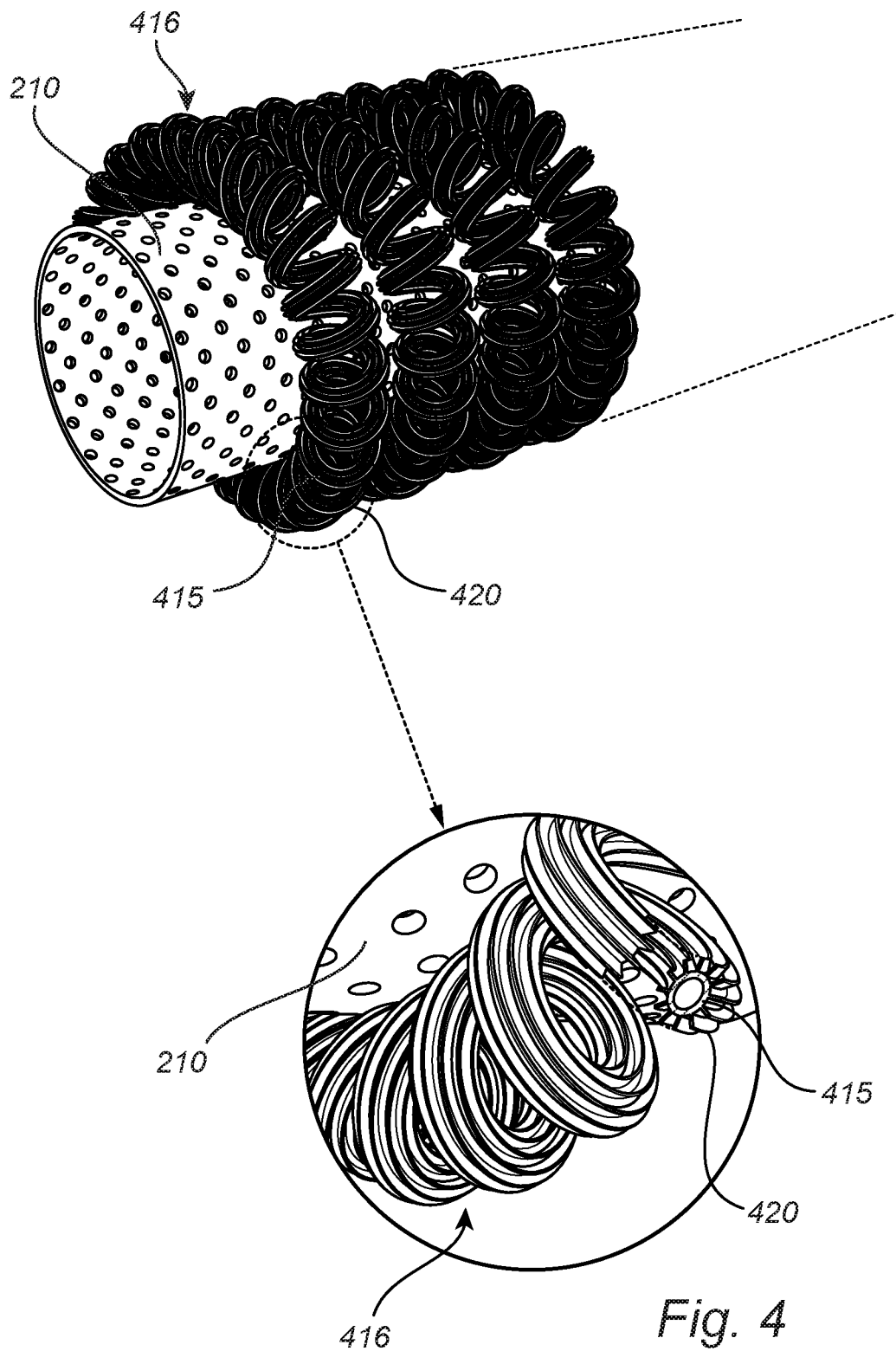

COMBINED HEAT EXCHANGER AND EXHAUST SILENCER

RELATED APPLICATION

This application claims priority under 35 U.S.C. § 119 based on European Patent Application No. 16188360.8, filed Sep. 12, 2016, the disclosure of which is hereby incorporated by reference herein.

FIELD OF THE INVENTION

The present invention relates to a combined heat exchanger and exhaust silencer for a vehicle.

BACKGROUND OF THE INVENTION

Generally, an internal combustion engine of a vehicle is equipped with an exhaust system. The exhaust system functions to reduce the noise from the engine while emitting the exhaust out from the engine. To reduce the noise an exhaust silencer is arranged to define a path for the exhaust gas such that the noise is reduced. Furthermore, the exhaust system may also comprise a catalytic converter for converting toxic gases in the exhaust gas to less toxic gases.

Heat from the exhaust gas may be recovered from the exhaust gas and be used for e.g. heating the cabin of the vehicle, the coolant in the radiator, the engine oil or the transmission oil in a so called heat-to-heat device. The recovered heat may also be used to produce electric energy or to provide additional power to the drive line of the vehicle using a heat-to-power device. For recovering the heat from the exhaust gas, a heat exchanger may be located as part of the exhaust system. In such heat exchanger for an internal combustion engine, heat is transferred from exhaust gas to a working media such as a fluid. The heat exchanger can be of various designs, such as tube or plate heat exchangers. However, heat exchangers are bulky, and space conflicts often occur if these heat exchangers are integrated in the exhaust line. Normally, also a bypass is required to switch off the waste heat recovery system at higher engine loads.

EP2733322 describes a heat exchanger for an exhaust system. In EP2733322, there is shown that heat exchanger pipes are arranged along a first path for the exhaust gas and there is also shown a bypass path in which the exhaust gas bypasses the heat exchanger pipes. However, improvements appear to be possible with relation to the heat exchanger efficiency and further also in relation to noise reduction in the bypass path.

Thus, there appear to be room for improvements over prior art exhaust systems having an integrated heat exchanger.

SUMMARY

In view of above-mentioned and other drawbacks of the prior art, it is an object of the present invention to provide a combined heat exchanger and exhaust silencer that alleviates at least part of the problem with prior art systems.

According to a first aspect of the invention, there is provided a combined heat exchanger and exhaust silencer for a vehicle, comprising: an inlet and an outlet for an exhaust gas flow; a housing arranged with a first end portion at the inlet and a second end portion at the outlet such that the exhaust gas can flow through the housing; a bypass pipe arranged in the housing, the bypass pipe having a perforated wall portion, the bypass pipe defining a first flow channel for the exhaust gas through the housing; a second pipe arranged in the housing, the second pipe having a perforated wall portion, the second pipe being arranged extend from the first end portion to the second end portion of the housing; a third pipe arranged in the housing, the third pipe having a perforated wall portion, the third pipe being arranged extend from the first end portion to the second end portion of the housing, the third pipe having a larger inner diameter than an outer diameter of the second pipe, wherein the second pipe is arranged in the third pipe such that a space between an outer surface of the second pipe and an inner surface of the third pipe defines a second flow channel for the exhaust gas through the housing; a heat exchanger pipe for defining a flow channel for a heat exchanging fluid, the heat exchanger pipe arranged as a spiral around the periphery of the second pipe, in the second flow channel, a sound absorbing material arranged in the housing and surrounding the bypass pipe and the third pipe, the sound absorbing material further being arranged inside the second pipe; a bypass valve configured to: in a first state, allow a flow path for exhaust gas to be open from the inlet to the outlet via the flow channel of the bypass pipe, and in a second state, close the flow path, whereby at least a main portion of the exhaust gas is forced through the second flow channel.

The perforated wall portions of the pipes comprise punched holes forming through-holes in the material of the pipes. The holes extend between an interior and the exterior of the pipe.

The bypass valve is configured to be switchable between at least the first state and the second state. The first state may generally be a "bypass state" in which the flow of exhaust gas is bypassed from flowing through the second flow channel. In the second state, the exhaust gas flows through the second flow channel thereby exchanging heat with the heat exchanger pipe, thus the second state may be a "heat exchanging state". In addition, the bypass valve may be only partly closed such that exhaust gas flows through both the first flow channel and the second flow channel. In this way the flow of exhaust gas and thus heat to the heat exchanger pipe may be controlled.

The heat exchanger pipe is configured to provide the heat exchanging fluid (i.e. a "cooling medium" or "working fluid") to a heat exchanger unit configured to recover the heat from the heat exchanging fluid. The heat exchanger unit may be e.g. a heat-to-heat device or a heat-to-power device. Thus, the relatively high temperature heat exchanging fluid is transported in the heat exchanger pipe to the heat exchanger unit where the heat is recovered and transferred elsewhere (e.g. to heat certain parts of the vehicle, or transformed to mechanical power to provide power to the drive line).

The present invention is based on the realization that a heat exchanger may be integrated in an exhaust silencer by including a configurable bypass valve. The bypass valve may control the flow of exhaust gas to flow through a bypass pipe and/or at least one pipe having a heat exchanger pipe arranged around it. The pipes (the bypass pipe, the second pipe and the third pipe) have perforations (e.g. punched holes) and are surrounded by sound absorbing material, in this way, sound absorbing functionality is realized both when the heat exchanger is engaged (second state) and in the bypass state.

According to an embodiment of the invention, the spiral heat exchanger pipe may be a double helical coil wound around the second pipe, wherein the heat exchanger pipe is wound around the second pipe along substantially the entire length of the second pipe which is located in the housing.

The helix type heat exchanger pipe has a spring-like formation which advantageously allows for thermal expansion with small risk of breakage.

According to an embodiment of the invention, the heat exchanger pipe may comprise cooling fins on the outer surface of the heat exchanger pipe. Thus, in order to further increase the contact area between the heat exchanger pipe and the exhaust gas to thereby improve the efficiency of the heat exchanger, cooling fins are included on the exterior of the heat exchanger pipe.

According to embodiments of the invention, the sound absorbing material may be further arranged such that it fills the housing from the first end portion to the second end portion of the housing, the sound absorbing material further being arranged to fill the interior of the second pipe at least inside the housing. This way, the sound absorbing functionality is improved in both the first state and the second state of the bypass valve. For example, the sound absorbing functionality is in this way improved over the entire length of at least the housing of the combined heat exchanger and exhaust silencer.

In one embodiment of the invention, the third pipe may comprise a non-perforated wall portion for collecting condensate liquid at the second end portion of the housing. In the second state, the relatively high temperature exhaust gas enters the second flow channel where the heat exchanger pipe is located at the first end, as the exhaust gas travels along the second flow channel it cools down (i.e. exchanges heat with the heat exchanger pipe) and condensate liquid (e.g. water) may be formed at the second end portion. The non-perforated wall portion which has no punched holes may be configured to collect the condensate liquid.

The combined heat exchanger and exhaust silencer may comprise a front wall in which the inlet is located and a rear wall in which the outlet is located, the front wall arranged to close the housing at the first end portion and the rear wall is arranged to close the housing at the second end portion. With the front wall and rear wall closing the housing, the inlet and the outlet are configured to allow exhaust gas to enter and exit the housing.

According to one embodiment of the invention, the axial length of the bypass pipe may be shorter than the length of the housing such that spacing are formed between the end portions of the bypass pipe and the front wall and the rear wall, wherein the axial length of the third pipe may be shorter than the length of the housing such that spacing are formed between the end portions of the third pipe and the front wall and the rear wall, whereby exhaust gas can flow from the inlet to the second flow channel and from the second flow channel to the outlet via a respective spacing at end portions of the bypass pipe and the front wall and the rear wall, and via the spacing at end portions of the third pipe and the front wall and the rear wall. In other words, the second pipe is longer than the third pipe and the bypass pipe. In this way, a path for the exhaust gas is formed into the second flow channel with the spacings.

In one embodiment, the axial length of the second pipe may be such that the second pipe extends from the front wall to the rear wall.

The bypass valve may be arranged on several possible locations. One possible implementation is that the bypass valve is arranged to close the first flow path on the bypass pipe. Thus, the bypass valve in arranged in the bypass pipe and is thereby configured to close the first flow path by closing the first flow channel. For example, the bypass valve may be located at the end portion of the bypass pipe near the second end portion of the housing at the rear wall. This way, the bypass valve is not exposed to the relatively high temperature exhaust gas entering the housing through the inlet at the front wall. In another embodiment, the bypass valve may be located at the end portion of the bypass pipe near the first end portion of the housing at the front wall. Thereby, the exhaust gas is not allowed to enter the bypass pipe in the second state.

In one embodiment, there may be a second valve configured to: in the first state, close a second flow path from the inlet to the outlet via the second flow channel. Thus, the second flow path includes the second flow channel and this second flow path may be closed by the bypass valve in the first state. In this way, the heat exchanging functionality may be at least partly shut off.

The bypass valve and the second valve may form a three-way valve. Such a valve is able to open a first path while at the same time close a second path.

The sound absorbing material is advantageously a porous material. For example the sound absorbing material may be glass fiber wool, mineral wool, ceramic wool, or stone wool.

According to a second aspect of the invention, there is provided a vehicle comprising the combined heat exchanger and exhaust silencer.

Effects and features of the second aspect of the invention are largely analogous to those described above in connection with the first aspect of the invention.

In summary, according to various embodiments the present invention relates to a combined heat exchanger and exhaust silencer for a vehicle, comprising a bypass valve configured to: in a first state, allow a flow path for exhaust gas to be open from an inlet to an outlet via an at least partly perforated bypass pipe, and in a second state, close the flow path, whereby at least a main portion of the exhaust gas is forced through a second flow channel comprising a heat exchanger pipe. The second flow channel is formed by an annular space between an at least partly perforated second pipe and an at least partly perforated third pipe. A sound absorbing material surrounds the bypass pipe and the third pipe, and is further arranged inside the second pipe.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 4 illustrates an example heat exchanger pipe arranged around a second pipe;

DETAILED DESCRIPTION OF EXAMPLE EMBODIMENTS

Figure 1:
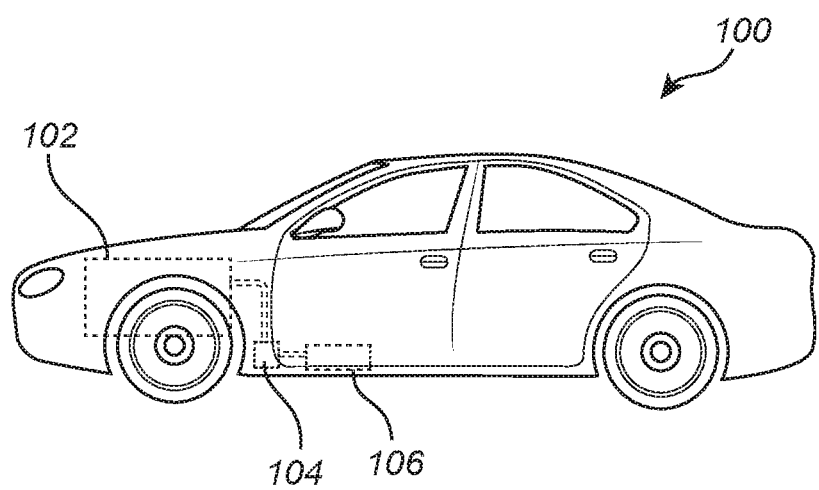
FIG. 1 schematically shows a vehicle according to an example embodiment of the present invention.

In the present detailed description, various embodiments of the system and method according to the present invention are mainly described with reference to a vehicle in the form of a car. However, the present invention mainly equally be used for other types of vehicles such as trucks, busses, etc. Thus, this invention may, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 schematically shows a vehicle in the form of a car 100. The car 100 comprises an internal combustion engine (ICE) 102 with its exhaust connected with pipes to catalytic converter 104. The exhaust gas flows from the ICE to the catalytic converter 104 which is configured to reduce the amount of toxic gases in the exhaust gas. Subsequently, the exhaust gas flows to a combined heat exchanger and exhaust silencer 106 according to embodiments of the invention.

Figure 2:
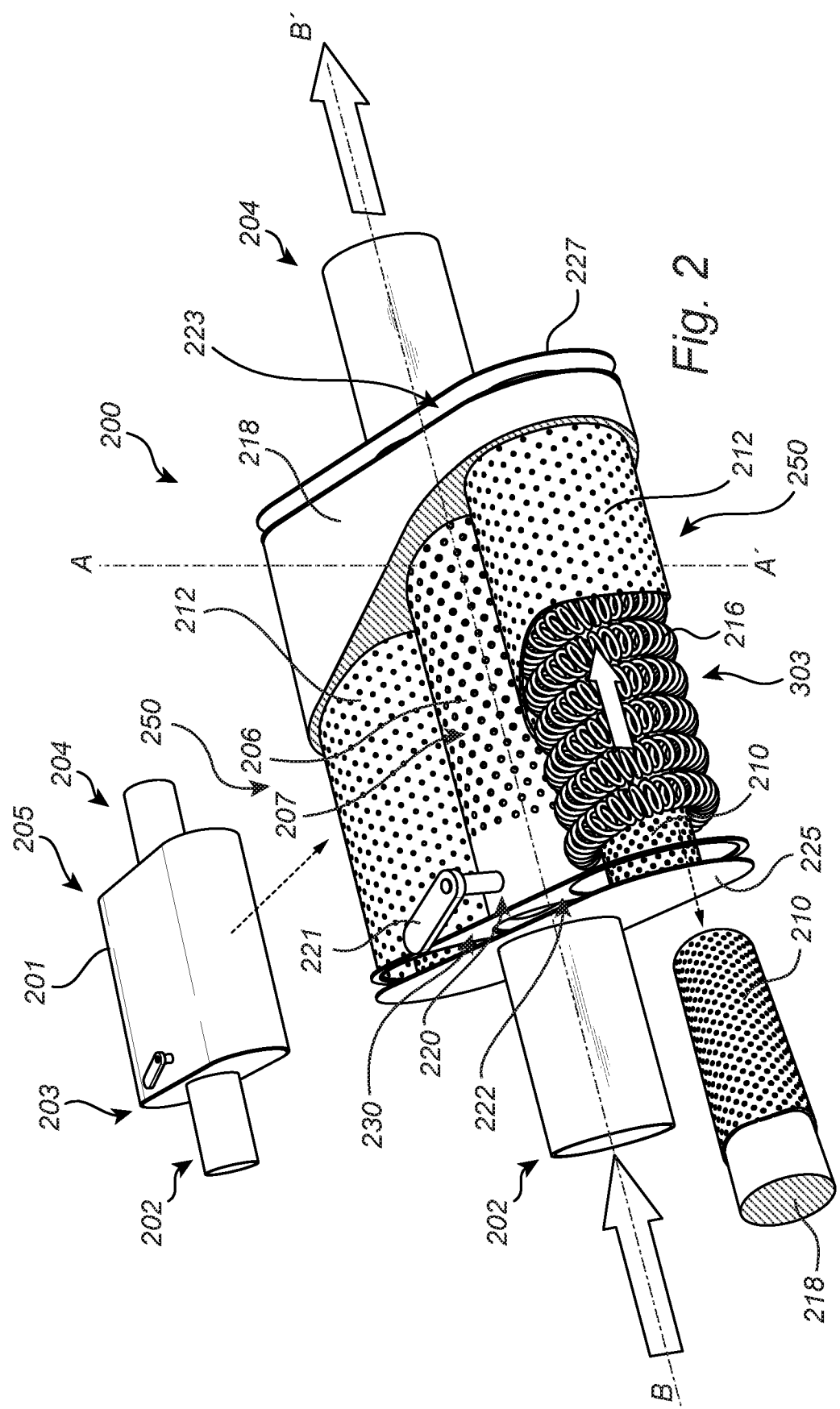
FIG. 2 illustrates a combined heat exchanger and exhaust silencer according to an example embodiment of the invention.
Figure 3A:
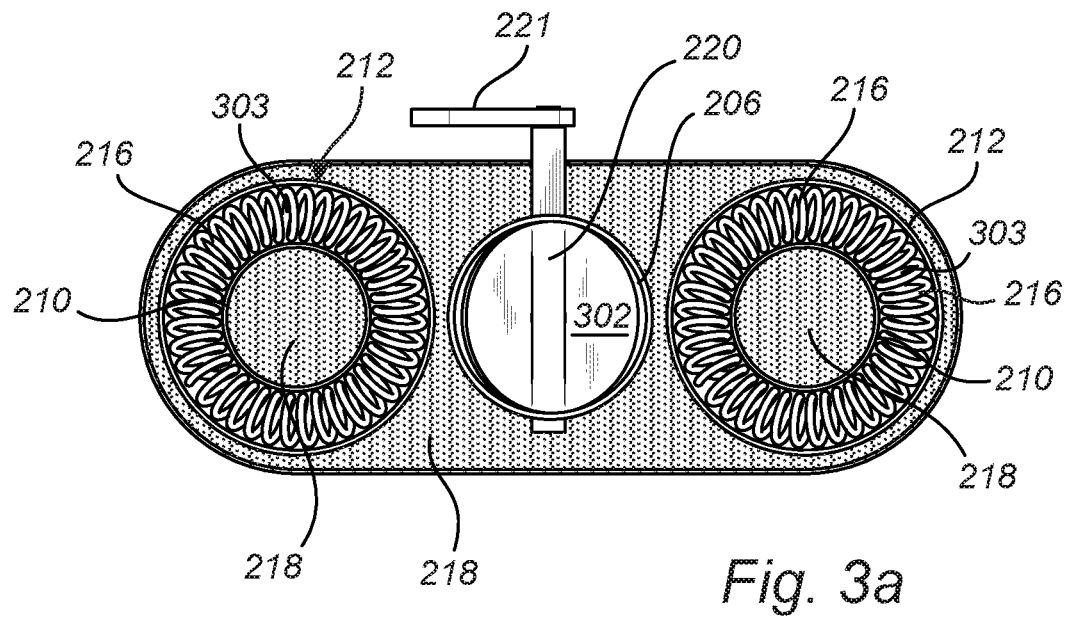
FIG. 3a is a cross-section of the combined heat exchanger and exhaust silencer in FIG. 2.
Figure 3B:
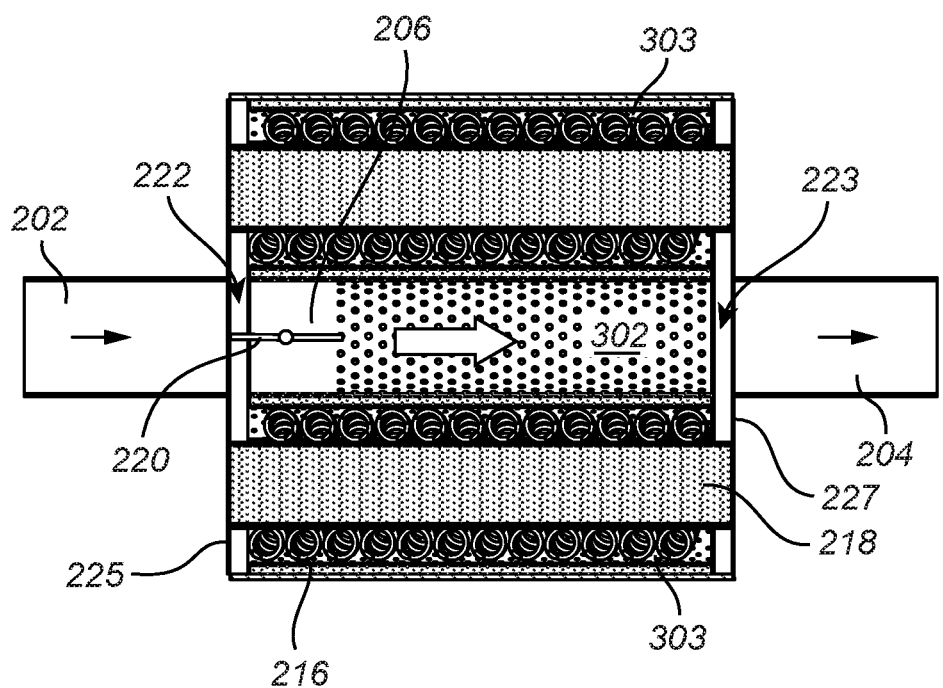
FIG. 3b is a cross-section of the combined heat exchanger and exhaust silencer in FIG. 2 with the bypass valve in a first state.
Figure 3C:
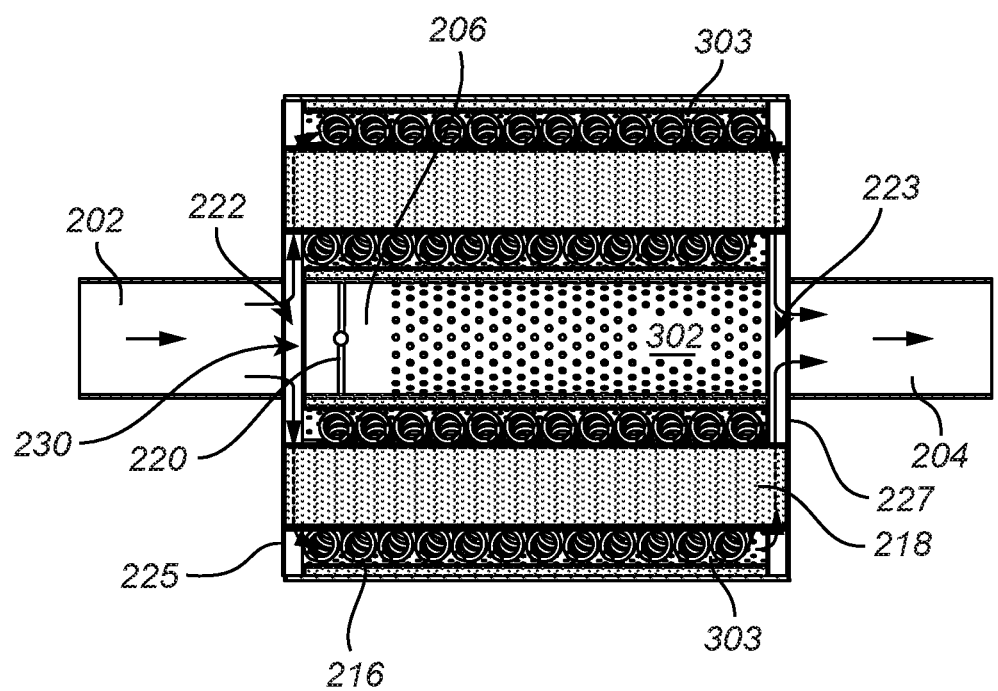
FIG. 3c is a cross-section of the combined heat exchanger and exhaust silencer in FIG. 2 with the bypass valve in a second state.

FIG. 2 in conjunction with FIG. 3a-c illustrates a combined heat exchanger and exhaust silencer 200 according to an embodiment of the invention. The combined heat exchanger and exhaust silencer 200 has an inlet 202 though which exhaust gas may enter the combined heat exchanger and exhaust silencer 200 (originating from e.g. the ICE 102 or catalytic converter 104), and an outlet 204 through which exhaust gas may exit the combined heat exchanger and exhaust silencer 200. There is further a housing 201 arranged with a first end portion 203 at the inlet 202 side and a second end portion 205 at the outlet 204 side of the combined heat exchanger and exhaust silencer 200, such that the exhaust gas can flow through the housing 201. Inside the housing there is a bypass pipe 206 having a perforated wall portion 207, the wall portion 207 of the bypass pipe 206 has a plurality of radial through holes into the interior of the bypass pipe 206. The bypass pipe 206 defines a flow channel (not shown, see FIG. 3c) for the exhaust gas though the housing 201 in a bypass state. For the heat exchanging part of the combined system 200, there is a second pipe 210 arranged in the housing 201, the second pipe 210 also having a perforated wall, in this embodiment the entire second pipe is perforated (the second pipe may also only be partly perforated in other embodiments). The second pipe 210 extends from the first end portion 203 to the second end portion 205 of the housing 201. This contributes to improved sound silencing in the heat exchanging state (described below). There is further a third pipe 212 in the housing 201. The third pipe 212 also has a perforated wall and extends form the from the first end portion 203 to the second end portion 205 of the housing 201. In this embodiment the entire third pipe is perforated (the second pipe may also only be partly perforated in other embodiments). Furthermore, the third pipe has a larger inner diameter than the outer diameter of the second pipe 206. This enables for the second pipe 210 to be arranged inside the third pipe 212. For example, the second 210 and the third pipe 212 may be concentrically arranged. There is thus spacing between the outer surface of the second pipe 210 and an inner surface of the third pipe 212 which defines a second flow channel 303 for the exhaust gas through the housing 201. A heat exchanger pipe 216 is arranged as a spiral around the second pipe 210 for defining a flow channel for a heat exchanging fluid comprising e.g. water, oil, glycol, ethanol, methanol or combinations of e.g. water/glycol, water/ethanol, or water/methanol etc. known in the art. The heat exchanger pipe 216 is arranged in the second flow channel 303 such that the heat in the exhaust gas flowing in the second flow channel may be transferred to the heat exchanging fluid in the heat exchanger pipe 216. In this embodiment, the heat exchanger pipe 216 is provided in the form of a double helical coil e.g. a helical shaped pipe wound around the second pipe 210. The bypass pipe 206, and the third pipe 210 may be held in place in the housing by a mounting plate 230 rigidly attached to the housing by e.g. welding or by screws. The second pipe 210 may be mounted to a front wall 227 and a rear wall 225.

With further reference to FIG. 2, a bypass valve 220 (see also FIG. 3a-c) is arranged in this embodiment on the bypass pipe 206. The bypass valve 220 is configured to open and close a flow path for the exhaust gas from the inlet 202 to the outlet 204 via the bypass pipe 206. Thus, in a first state, the bypass valve is configured to allow a flow path for exhaust gas to be open from the inlet 202 to the outlet 204 via the flow channel 302 of the bypass pipe 206. In a second state, the bypass valve is configured to close the flow path, whereby at least a main portion of the exhaust gas is forced through the second flow channel 303. When the exhaust gas flows though the second flow channel, it flows in contact with the heat exchanger pipe 216 such that heat may be transferred from the exhaust gas to the heat exchanger fluid flowing in the heat exchanger pipe 216. In this particular embodiment, the bypass valve 220 closes the flow path inside the bypass pipe 206. However, the bypass valve 220 may be located outside the bypass pipe 206, for example at the inlet before the bypass pipe 206 in the exhaust gas flow to direction the exhaust gas to the bypass pipe 206 in the first state and to the second flow channel 303 in the second state.

In addition, a sound absorbing material 218 such as glass fiber wool is arranged surrounding the bypass pipe 206 and the third pipe 212. Furthermore, sound absorbing material 218 is also arranged inside the second pipe 210. Preferably, the sound absorbing material 218 fills the housing from the first end portion 203 to the second end portion 205 and the inside of the second pipe 212. This improves the sound silencing effect of the combined heat exchanger and exhaust silencer 200 in both the bypass state and in the second state (the heat exchanging state).

In the embodiment shown in FIG. 2, the housing has a shape with an oval cross-section, however, other shapes are possible (e.g. circular, rectangular, etc.). Furthermore, the inlet and the outlet may be part of the housing, or as shown in FIG. 2, the inlet 202 may be part of a front wall 225 and the outlet may be part of a rear wall 227, the front wall and the rear wall being mounted to close the housing 201 the first end portion 203 and the second end portion 205. The inlet and the outlet may be a through hole through the respective wall, and may comprise additional piping if necessary. The front wall 225 and the rear wall 227 may be secured to the housing by e.g. screws or by welding.

With further reference to FIG. 2 in combination with FIG. 3b-c, the axial length of the second pipe 210 is such that the second pipe 210 extends from the front wall 225 to the rear wall 227, thus maximizing the length of the second pipe 210 in the housing to thereby enable a longer heat exchanger pipe 216 and improved sound silencing in the second state (heat exchanging state). Furthermore, the bypass pipe 206 is shorter than the length of the housing such that spacing 222 is formed between the front wall 225 and the bypass pipe 206 and a spacing 223 between the rear wall 227 and the bypass pipe 206. Furthermore, the third pipe 212 is shorter than the length of the housing. With this configuration, exhaust gas can flow from the inlet 202 to the second flow channel 303 and from the second flow channel 303 to the outlet 204 via a respective spacing 222, 223 at the end portions of the bypass pipe 206 and the front wall 225 and the rear wall 227.

The embodiments shown herein is shown with two heat exchanging units 250, each comprising a second pipe 210, a third pipe 212 and a heat exchanger pipe 216. However, the invention is equally applicable with a single heat exchanging unit or with more than two heat exchanging units, such as three, four, five heat exchanging units, etc. In FIG. 2, the two heat exchanging units are arranged on opposite sides of the bypass pipe substantially in parallel with the bypass pipe 216.

FIG. 3a illustrates a cross-section of the combined heat exchanger and exhaust silencer 200 along A-A'. In FIG. 3a there is shown that the second pipe 210 is axially arranged inside the third pipe 212. Further, the spacing forming the second flow channel 303 is formed between the second 210 and the third pipe 212. The heat exchanger pipe 216 is arranged in the second flow channel 303. Furthermore, sound absorbing material 218 surrounds the bypass pipe 206 and the third pipe 212, and sound absorbing material further fills the inside 219 of the second pipe 210.

FIG. 3b-c shows a cross-section along B-B' of the combined heat exchanger and exhaust silencer 200 being in two different states, in the first state being a bypass state (FIG. 3b) and a second state being a heat exchanger state (FIG. 3c).

First with reference to FIG. 3b, the bypass valve is in the first state in which the bypass valve 220 is open. In this first state, a bypass state, the exhaust gas indicated by arrows, enters the inlet 202 and the main part of the exhaust gas will flow through the first flow channel 302 defined by the first pipe 206. The first flow channel is the path of lowest resistance for the exhaust gas in the first state, thus the main portion of the exhaust gas will flow through the bypass pipe 206 in the first flow channel 302. A portion of the exhaust gas may flow though the second flow channel 303 since the second flow channel 303 is open. The perforations allow for sound waves to penetrate outside of the first pipe 206 and be absorbed by the sound absorbing material 218 (e.g. glass fiber wool). In other words, sound silencing is efficiently accomplished in the first state of the bypass valve 220.

Turning to FIG. 3c, illustrating a cross-section of the combined heat exchanger and exhaust silencer 200 with the bypass valve 220 in the second state in which the flow path going through the first flow channel is closed. In this second state, the exhaust gas enters the inlet 202 and is forced to the second flow channel 303 since the first flow channel 302 is closed. The perforations of the second pipe 210 and the third pipe 212 allows the sound waves to penetrate though the pipes 210, 212 and be at least partly absorbed by the surrounding sound absorbing material 218, and the sound absorbing material in the second pipe 210. Further, the sound absorbing material 218 in the second pipe 210 closes the path through the second pipe 206, thereby further forcing the exhaust gas to flow through the second flow channel 303 where the heat exchanger pipe 216 is located. As the exhaust gas flows through the second flow channel 303 it comes in contact with the heat exchanger pipe 216 which is made from a heat conducting material such as steel, stainless steel or any other metal compliant with the heat exchanging fluid. The heat exchanging fluid (e.g. water, oil, glycol, ethanol, methanol or combinations of e.g. water/glycol, water/ethanol, or water/methanol etc. known in the art) flows in the in the heat exchanger pipe 216 from an inlet (not shown) of the heat exchanger pipe 216 to an outlet (not shown). The heat exchanging fluid has a relatively low temperature when it enters the heat exchanger pipe 216 where it is heated by the relatively high temperature exhaust gas. Thus, the temperature of the heat exchanging fluid is higher when it leaves the heat exchanger pipe 216 compared to the temperature it had when it entered the heat exchanger pipe 216. In addition, the bypass valve may be only partly closed such that exhaust gas flows through both the first flow channel 302 and the second flow channel 303. In this way the, flow of exhaust gas and thus heat to the heat exchanger pipe 216 may be controlled.

The double helical type heat exchanger pipe 216 is advantageous since it increases the contact area between the exhaust gas and heat exchanger pipe and it increases the length of the flow path for the heat exchanging fluid compared to in a single wound heat exchanger pipe, thereby improving the efficiency of the heat exchanger. Furthermore, since the temperature range in an exhaust system of a vehicle can range from about −50° C. to about 2000° C., the parts of the exhaust system will be subject to thermal expansion. The double helical type heat exchanger pipe 216 has a spring-like formation which advantageously allows for thermal expansion with small risk of breakage.

Turning now to FIG. 4 illustrating a heat exchanger pipe 416 of a combined heat exchanger and exhaust silencer 200 according to an embodiment. This heat exchanger pipe 416 comprises cooling fins 420 on the outer surface of the heat exchanger pipe 416. The cooling fins 420 further increases the outer surface area of the heat exchanger pipe 416 thus improving the efficiency of the heat exchanger further, i.e. the contact area between the exhaust gas and the heat exchanger pipe 416 is increased by the cooling fins 420. The cooling fins 420 shown in FIG. 4 are longitudinal cooling fins 420 substantially parallel the main pipe body 415. Naturally, other types of cooling fins are possible and within the scope of the invention, for example a spiral cooling fins annularly arranged in spiral manner around the main pipe body 415. Each of the flanges may be in one piece along the entire heat exchanger pipe. Alternatively or additionally, each of the cooling fins may be in cut in several pieces along the entire heat exchanger pipe. The heat exchanger pipe may for example have a diameter selected from the range of 4 mm to 13 mm. The bypass pipe 206 may have an inner diameter selected from the range of 30 mm to 90 mm.

Figure 5:
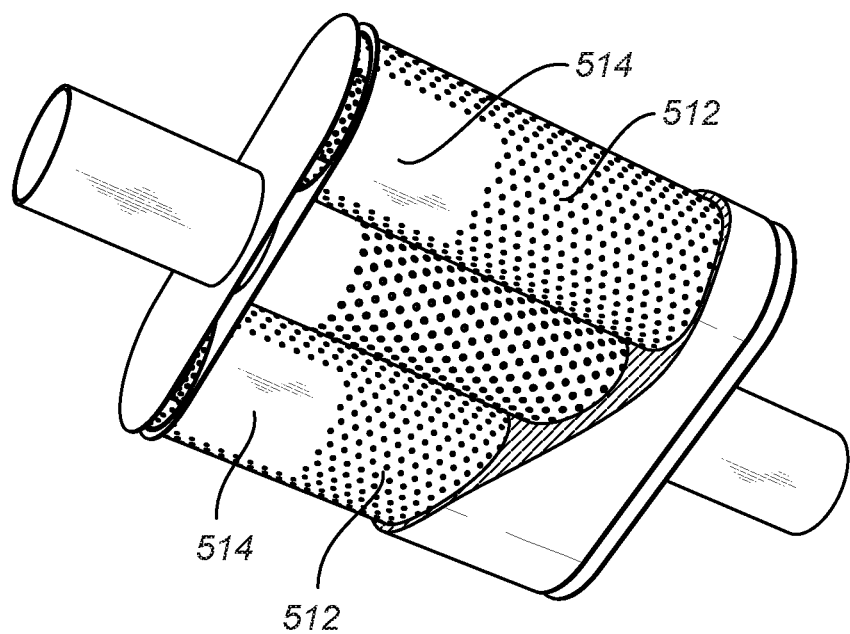
FIG. 5 illustrates an exemplary embodiment of the invention.

With reference to FIG. 5 illustrating a further embodiment of the invention in which the third pipe 512 comprises a non-perforated wall portion 514 for collecting condensate liquid (e.g. comprising water) at the second end portion 205 of the housing. The wall portion 514 which is not perforated thus forms a rounded portion which may collect and hold liquid. The condensate liquid may be transferred away from the combined heat exchanger and exhaust silencer 200 by additional tubing (not shown).

Figure 6:
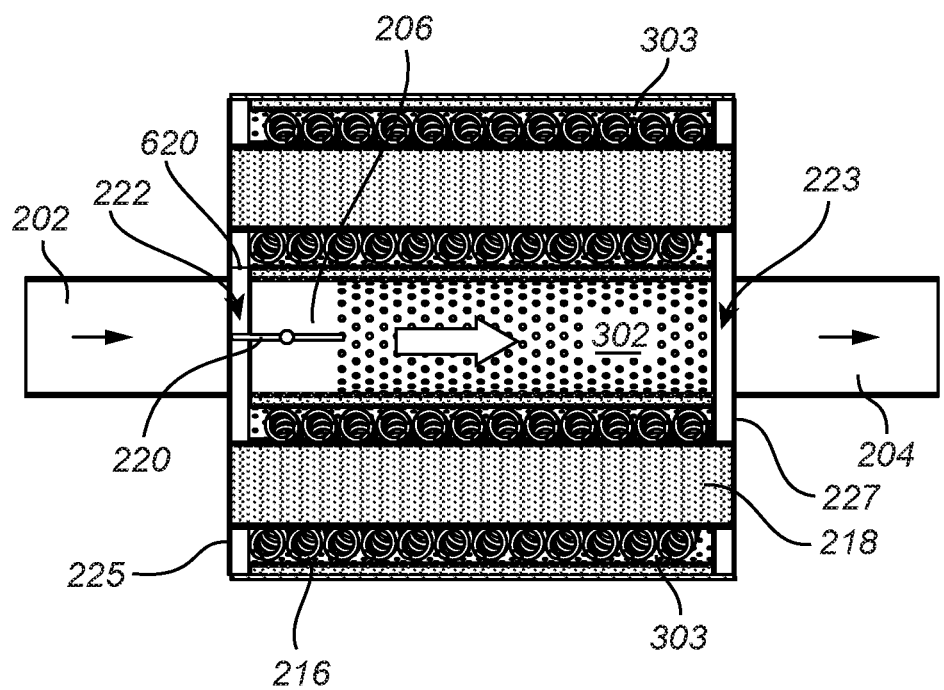
FIG. 6 illustrates a cross-section of an exemplary embodiment of the invention.

FIG. 6 shows a cross-section of another embodiment in which a three-way bypass valve arrangement including the bypass valve 220 and a second valve 620. The second valve 620 arranged to open and close the flow through the second flow channel 303 (here only one of the flow channels 303 has a respective valve, but naturally both heat exchanging units may comprise a respective second valve) and is be arranged such that in the first state the second flow path from the inlet to the outlet via the second flow channel 303 is closed. The numbered parts of the embodiment shown in FIG. 6 are the same as the numbered parts already discussed with reference to FIGS. 3a-c and FIG. 2 and are not further discussed here.

The bypass valves 220 or 620 are actuated by e.g. an electric motor (not shown) or a pneumatic motor (not shown). The electric motor is preferred; however a pneumatic motor may be advantageous in case of excessive temperatures close to the valves. The actuator (e.g. the electric motor) is controlled by a control unit (not shown) to open or close the bypass valve based on for example the need for heat recovery and/or to protect the heat exchanger unit 250 from overheating. A lever 221 for the bypass valve extends outside the housing 201 such that the state of the bypass valve can be controlled by an external actuator (not shown).

A control unit may include a microprocessor, microcontroller, programmable digital signal processor or another programmable device.

The person skilled in the art realizes that the present invention by no means is limited to the preferred embodiments described above. On the contrary, many modifications and variations are possible within the scope of the appended claims. For example, the bypass pipe may be arranged inside the second pipe. In other words, the bypass pipe, the second pipe and the third pipe may all be concentrically arranged.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A combined heat exchanger and exhaust silencer for a vehicle, comprising:
    an inlet and an outlet for an exhaust gas flow;
        a housing arranged with a first end portion at said inlet and a second end portion at said outlet such that the exhaust gas can flow through said housing;
        a bypass pipe arranged in said housing, said bypass pipe having a perforated wall portion, said bypass pipe defining a first flow channel for the exhaust gas through said housing;
        a second pipe arranged in said housing, said second pipe having a perforated wall portion, said second pipe being arranged extend from said first end portion to said second end portion of said housing;
        a third pipe arranged in said housing, said third pipe having a perforated wall portion, said third pipe being arranged extend from said first end portion to said second end portion of said housing, said third pipe having a larger inner diameter than an outer diameter of said second pipe, wherein said second pipe is arranged in said third pipe such that a space between an outer surface of said second pipe and an inner surface of said third pipe defines a second flow channel for the exhaust gas through said housing;
        a heat exchanger pipe for defining a flow channel for a heat exchanging fluid, said heat exchanger pipe arranged as a spiral around the periphery of said second pipe, in said second flow channel,
        a sound absorbing material arranged in said housing and surrounding said bypass pipe and said third pipe, said sound absorbing material further being arranged inside said second pipe;
        a bypass valve configured to:
            in a first state, allow a flow path for exhaust gas to be open from said inlet to said outlet via said flow channel of said bypass pipe, and
            in a second state, close said flow path, whereby at least a main portion of said exhaust gas is forced through said second flow channel.

2. The combined heat exchanger and exhaust silencer according to claim 1, wherein said spiral heat exchanger pipe is a double helical coil wound around said second pipe, wherein said heat exchanger pipe is wound around said second pipe along substantially the entire length of said second pipe which is located in said housing.

3. The combined heat exchanger and exhaust silencer according to claim 1, wherein said heat exchanger pipe comprises cooling fins on the outer surface of said heat exchanger pipe.

4. The combined heat exchanger and exhaust silencer according to claim 1, wherein said sound absorbing material is further arranged to fill the housing from the first end portion to the second end portion of the housing, said sound absorbing material further being arranged to fill the interior of said second pipe at least inside the housing.

5. The combined heat exchanger and exhaust silencer according claim 1, wherein said third pipe comprises a non-perforated wall portion for collecting condensate liquid at said second end portion of said housing.

6. The combined heat exchanger and exhaust silencer according to claim 1, comprising a front wall in which said inlet is located and a rear wall in which said outlet is located, said front wall arranged to close the housing at the first end portion and said rear wall is arranged to close said housing at the second end portion.

7. The combined heat exchanger and exhaust silencer according to claim 6, wherein the axial length of said bypass pipe is shorter than the length of the housing such that spacing are formed between the end portions of the bypass pipe and the front wall and the rear wall, wherein the axial length of said third pipe is shorter than the length of the housing such that spacing are formed between the end portions of the third pipe and the front wall and the rear wall, whereby exhaust gas can flow from the inlet to the second flow channel and from the second flow channel to the outlet via a respective spacing at end portions of the bypass pipe and the front wall and the rear wall, and via the spacing at end portions of the third pipe and the front wall and the rear wall.

8. The combined heat exchanger and exhaust silencer according to claim 6, wherein the axial length of said second pipe is such that the second pipe extends from the front wall to the rear wall.

9. The combined heat exchanger and exhaust silencer according to claim 1, wherein said bypass valve is arranged to close the first flow path on said bypass pipe.

10. The combined heat exchanger and exhaust silencer according to claim 9, wherein said bypass valve is located at the end portion of the bypass pipe near the second end portion of the housing at the rear wall.

11. The combined heat exchanger and exhaust silencer according to claim 1, further comprising a second valve configured to:
    in said first state, close a second flow path from the inlet to the outlet via said second flow channel.

12. The combined heat exchanger and exhaust silencer according to claim 11, wherein the bypass valve and the second valve forms a three-way valve.

13. The combined heat exchanger and exhaust silencer according to claim 1, wherein said sound absorbing material is glass fiber wool, mineral wool, ceramic wool, or stone wool.

14. The combined heat exchanger and exhaust silencer according to claim 1, wherein said second pipe, said third pipe and said heat exchanger pipe forms a first heat exchanging unit, wherein the combined heat exchanger and exhaust silencer further comprises a second heat exchanger unit, wherein said bypass pipe is arranged between said first heat exchanging unit and said second heat exchanging unit.

15. A vehicle comprising the combined heat exchanger and exhaust silencer according to claim 1.

* * * * *